United States Patent [19]
Lemon et al.

[11] Patent Number: 5,574,915
[45] Date of Patent: Nov. 12, 1996

[54] OBJECT-ORIENTED BOOTING FRAMEWORK

[75] Inventors: Steven P. Lemon, Los Gatos; Patrick D. Ross, Sunnyvale, both of Calif.

[73] Assignee: Taligent, Cupertino, Calif.

[21] Appl. No.: 171,595

[22] Filed: Dec. 21, 1993

[51] Int. Cl.⁶ .................................................. G06F 9/445
[52] U.S. Cl. ..................... 395/700; 364/DIG. 1; 364/280.2
[58] Field of Search ..................................... 395/650, 700

[56] References Cited

U.S. PATENT DOCUMENTS

| | | | |
|---|---|---|---|
| 4,622,633 | 11/1986 | Ceccon et al. | 364/DIG. 1 |
| 4,821,220 | 4/1989 | Duisberg | 364/578 |
| 4,885,717 | 12/1989 | Beck et al. | 364/DIG. 2 |
| 4,891,630 | 1/1990 | Friedman et al. | |
| 4,953,080 | 8/1990 | Dysart et al. | 364/DIG. 1 |
| 5,041,992 | 8/1991 | Cunningham et al. | |
| 5,050,090 | 9/1991 | Golub et al. | |
| 5,060,276 | 10/1991 | Morris et al. | |
| 5,075,848 | 12/1991 | Lai et al. | 395/425 |
| 5,093,914 | 3/1992 | Coplien et al. | 395/700 |
| 5,119,475 | 6/1992 | Smith et al. | |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 395/650 X |
| 5,187,786 | 2/1993 | Densmore et al. | 395/600 |

FOREIGN PATENT DOCUMENTS 398644 11/1990 European Pat. Off. .

*Primary Examiner*—Thomas M. Heckler
*Attorney, Agent, or Firm*—Bookstein & Kudirka

[57] ABSTRACT

An object-oriented framework contains program code for booting a processor with a volatile storage from an attached non-volatile storage. The framework provides a hardware independent boot image base class which can be subclassed to provide boot image program code for each specific hardware configuration. The boot image program code performs low level tasks such as determining the hardware configuration and loading kernel code into the volatile memory. Once the kernel has been loaded into memory it is initialized using the configuration information to provide a hardware-independent platform. Further non-subclassable code is used to establish support for accessing object-oriented shared libraries in the non-volatile storage. Finally an object-oriented environment is established by instantiating a file object from the shared libraries.

15 Claims, 10 Drawing Sheets

Hardware Hierarchy

Software Hierarchy 5,574,915

OBJECT-ORIENTED BOOTING FRAMEWORK

BACKGROUND OF THE INVENTION

1. Field of the Invention

The present invention is generally directed to an input/output architecture for a computer system, and more particularly directed to an object-oriented input/output architecture for a computer system.

2. Related Art

A typical computer includes an input/output (IO) system to interface with peripheral devices which are connected to the computer. This IO system serves as an interface between resources of the computer system and the peripheral devices. This IO system also serves as an interface between programs executing on the computer system and the peripheral devices.

IO systems are typically implemented using conventional "procedure-oriented" software programming techniques (as opposed to object-oriented or rule-based software programming techniques). As will be appreciated, software programs produced using procedure-oriented software programming techniques are often not easily extendible. Also, often such software programs cannot be easily reused. Thus, conventional IO systems are often not easily extendible, and the software associated with such IO systems are often not easy to reuse.

Typically, an IO system is implemented such that it is specific to a single operating system. The IO system responds to and correctly processes the IO function calls which are associated with the operating system, but the IO system does not have the capability to support any other operating systems. There is a growing need for computers which support multiple operating systems. Clearly, a computer which uses a conventional IO system is at a disadvantage in today's market since it can support only the operation system which the IO system supports.

Thus, what is required is an input/output system for a computer which is easily extendible, which embodies software which is easy to reuse, and which supports multiple operating systems.

SUMMARY OF THE INVENTION

The present invention is directed to an object-oriented booting framework for initializing first a degradated file sharing mechanism with fully defined objects for use in enabling more sophisticated aspects of the operating system. An object-oriented framework is disclosed for use in booting a processor with a storage and attached peripherals. The framework utilizes object-oriented techniques for initializing a computer system by resetting the storage and one or more peripherals. Then, the framework initializes a degredated object-oriented environment for use in activating an operating system personality. The degredated operating envronment enables file sharing and other basic tasks of importance in loading in the IO devices, system preferences, and hardware configurations and replaces itself with the IO file system frameworks for use by the operpating system.

Further features and advantages of the present invention, as well as the structure and operation of various embodiments of the present invention, are described in detail below with reference to the accompanying drawings.

DETAILED DESCRIPTION OF THE PREFERRED EMBODIMENTS

Overview

A preferred embodiment is directed to an input/output (IO) system for a computer. The IO system of a preferred embodiment is easily extendible, embodies software which is easy to reuse, and supports multiple operating systems. Other advantages of a preferred embodiment are discussed below.

Object technology is used to implement the IO system of a preferred embodiment. Thus, the a preferred embodiment represents an object-oriented IO system. The use of object technology is pervasive and supports abstractions for many low-level services such as interrupt processing which to date have been processor-specific and procedural in nature. These generalized object based abstractions, together with the use of micro-kernel technology, enable the generation of a new model for device interfacing.

The IO system of a preferred embodiment is an association of service providers and their clients. In order to provide a meaningful service to its clients, the IO system becomes a client of several other service providers.

Figure 10:
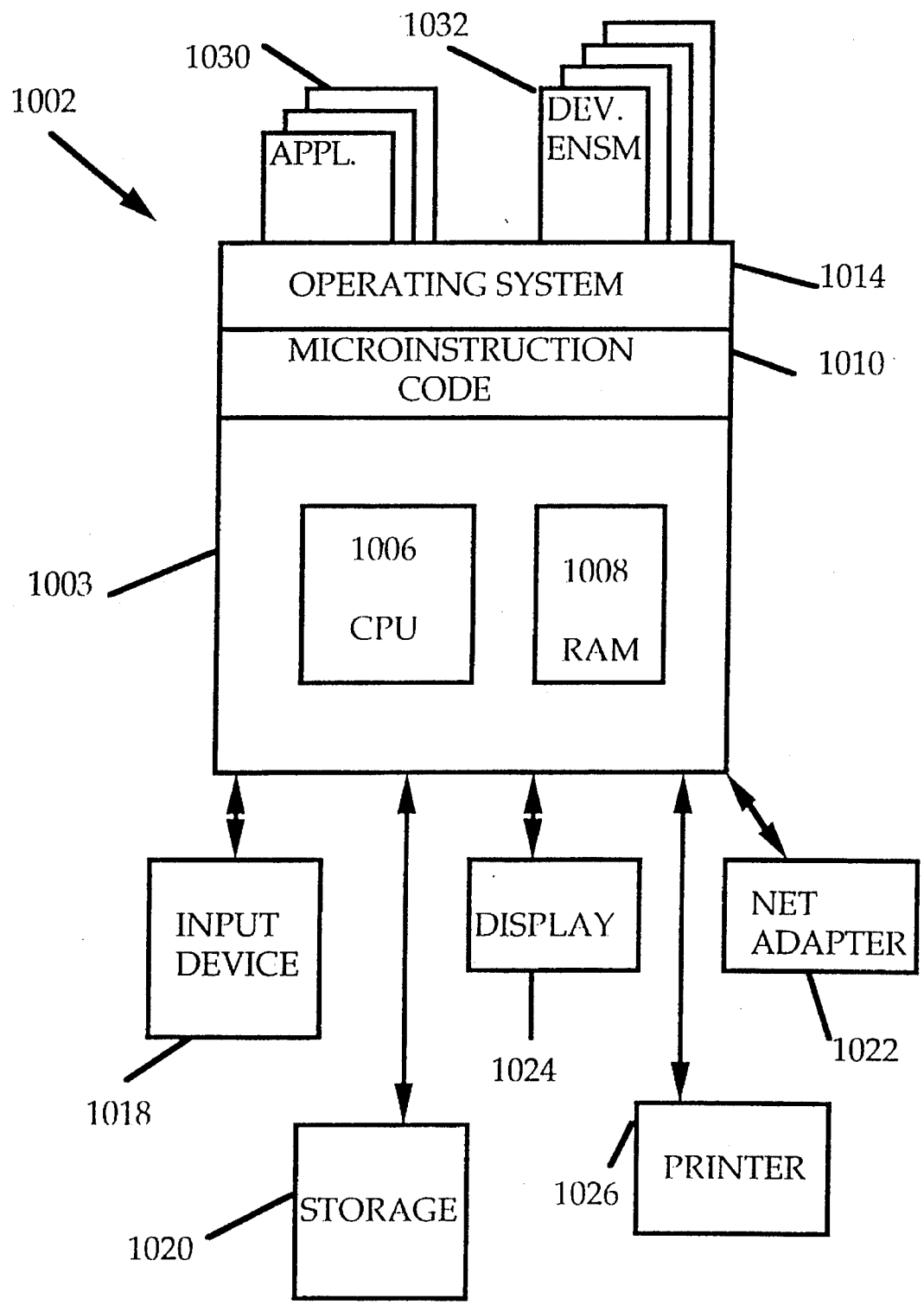
FIG. 10 is a block diagram of a computer platform on which the IO system of a preferred embodiment operates.

FIG. 10 illustrates a block diagram of a computer platform 1002 in which the object-oriented IO system in accordance with a preferred embodiment. It should be noted that a preferred embodiment alternatively encompasses the IO system in combination with the computer platform 1002.

The computer platform 1002 includes hardware components 1003, such as a random access memory (RAM) 1008 and a central processing unit (CPU) 1006. It should be noted that the CPU 1006 may represent a single processor, but preferably represents multiple processors operating in parallel.

The computer platform 1002 also includes peripheral devices which are connected to the hardware components 1003. These peripheral devices include an input device or devices (such as a keyboard, a mouse, a light pen, etc.) 1018, a data storage device 1020 (such as a hard disk or floppy disk), a display 1024, a printer 1026, and a network adapter 1022. The computer platform 1002 could be connected to other peripheral devices.

The computer platform 1002 also includes an operating system 1014, and may include microinstruction code 1010 (also called firmware). The operating system 1014 may represent a substantially full-function operating system, such as the Disk Operating System (DOS) and the UNIX operating system. However, the operating system 1014 may represent other types of operating systems. Preferably, the operating system 1014 represents a limited functionality operating system, such as the Mach micro-kernel developed by IBM, which is well-known to those skilled in the relevant art. Full featured operating systems may operate as application programs 1030 on the computer platform 1002.

In a preferred embodiment, the computer platform 1002 is an International Business Machines (IBM) computer or an IBM-compatible computer. In an alternative embodiment, the computer platform 1002 is an Apple computer.

One or more application programs 1030 operate in parallel on the computer platform 1002. Also, one or more device ensembles 1032 operate on the computer platform 1002.

The device ensembles 1032 collectively represent the object-oriented IO system of a preferred embodiment. The device ensembles 1032 operate with each other to provide IO services to end users (such as the applications 1030). The device ensembles 1032 are discussed in greater detail below.

As discussed above, the applications 1030 may represent operating systems, such as IBM OS/2. Since these applications 1030 are clients of the device ensembles, the IO system of a preferred embodiment supports a plurality of operating systems.

The elements of the computer platform 1002 could be depicted in FIG. 10 in other ways. For example, the device ensembles 1032 could be illustrated as being part of the operating system 1014 (such that the device ensembles 1032 and the operating system 1014 would occupy the same layer in the computer platform 1002).

OVERVIEW OF SELECTED OBJECT-ORIENTED TECHNOLOGY CONCEPTS

Object-orient technology and computer programming techniques are generally well known and described in many publicly available documents, such as Object-Oriented Design by Grady Booch (Benjamin Cummings 1991) and Object-Oriented Requirements Analysis and Logical Design by Donald Firesmith (Wiley 1993). Selected features of object-oriented technology pertinent to the present invention are discussed in this section.

Objects

Two views of object programming have flowed into the object-oriented (OO) industry mainstream: self-supporting stand-alone objects and collaborative lightweight objects. These views are discussed below.

One view of object technology migrates toward the philosophy of "heavy-weight" objects. This object design tends to encapsulate as much as possible into a single, stand-alone entity. An example might be a data base object which encapsulates all the subtleties of a disk-based relational filing system in a single object. Such an object would embody and implement the abstractions of field, tuple, table, relation, index and perhaps query.

This approach yields objects with a large granularity and limits the flexibility of the embodied abstractions. To refine or adapt the field abstraction could very well require intimate knowledge of the data base object's internal structure.

In contrast, the light-weight view of objects tends to limit the scope of individual objects to functionally and semantically consistent puzzle pieces designed to collaborate with (perhaps many) other objects in order to achieve a goal. These are often highly flexible objects which are used (and reused) on a greater scale.

In this view of objects a simple data base might be a collaborative set of field objects associated by tuple objects which are in turn contained by table objects. An index, relation, or query would be separate entities, collaborating approximately with field, tuple, and table. Each of these abstractions is able to provide a consistent interface and each may be easily subclassed to adopt new behaviors.

In a gross simplification, one could draw the analogy between software libraries and individual subroutines when looking at these two different approaches to objects. Both provide some self contained unit of encapsulation and reuse. A preferred embodiment utilizes light-weight, fine granularity, collaborative objects extensively.

Frameworks

To provide necessary structure to the various subsystems, the lightweight objects are woven into the fabric of a design framework in which the public interfaces and inter-relationships are well defined. If objects are the unit of code reuse, frameworks are the unit of design reuse. Frameworks are generally well known. Frameworks can span entire class hierarchies, simultaneously providing the enveloping architecture and expressing the systematic organization of the design. Frameworks may decompose into sub-frameworks or several frameworks may be encompassed by a larger framework.

If the framework is the embodiment of design, then there must be a term to call the set of objects which implement a framework. For example, in C++ classes and objects are often spoken of separately, distinguishing between the two by saying a class is the specification and an object is an instance of the class. According to a preferred embodiment, an implementation "instance" of a framework is called an ensemble. This term "ensemble" indicates those classes which collectively implement a framework. For example, the product which in the past has been called a "device driver" becomes a Device Ensemble.

Frameworks allow commonalty to be managed through collaboration and inheritance between the various pieces of an ensemble. Through the use of well defined class hierarchies, commonalty is pursued and distilled only where it makes sense in the overall design. Each framework may present its clients with an appropriate and desirable interface instead of being confined to a "one-size-fits-all" paradigm enforced across all frameworks.

Features and Advantages of a preferred embodiment

Some features and advantages of the object-oriented IO system of a preferred embodiment were discussed above. Additional features and advantages are discussed in the following sections.

Enabling A Developer

The extensive use of objects and frameworks is new to the field of hardware device interface software and serves to assist the ensemble author in a number of ways. First, the framework serves to guide the author through the design issues of orderly start-up, receiving interrupt notification, servicing device hardware, and orderly shutdown. Second, reuse of ensemble objects with similar characteristics and purposes allows the author to concentrate on only those behaviors which are necessarily different.

For example, the author of an ensemble for a new disk controller card may be able to derive from an existing ensemble, over-riding only those functions which do actual hardware access. In contrast to this, the author of an ensemble for an entirely new piece of hardware may not have the luxury of an ensemble on the shelf to derive from. In this case, many of the low-level IO frameworks defined by a preferred embodiment will assist the effort by providing design and architectural guidance to the author.

Encouraging hardware and software innovation

Conventional hardware and software innovation often suffer from mutual knowledge which is too intimate. Because operating system and application software "know too much" about the underlying hardware platform, they exploit this knowledge for maximum value. Use of this information locks hardware vendors into a mode where change is very hard to accomplish without breaking applications. Additionally, this knowledge makes it difficult for software to escape the least common denominator syndrome.

Using object abstractions throughout low level subsystems allows this deadlock to be resolved. Framework interfaces serve not only to hide the hardware details from the application, they also hide the application details from the hardware. This well defined interface between hardware-dependent and hardware-independent parts of the overall system encourages both hardware and software innovation, since the hardware as well as the object based software can change without effects rippling throughout the entire system.

Location independent device abstractions

By implementing a logical software hierarchy, providing a common abstraction, and utilizing a shared library system, the IO architecture allows the same device ensemble to be used regardless of the physical location or number of occurrences of the hardware. This is to say that an ensemble for a specific UART chip could service both a port on the motherboard planar and a port on a third party expansion card without additional work on the ensemble author's part.

Let resources find you

Another fundamental problem with existing systems is the perspective of the configuration data base(s) involved. The current top-down resource hunting perspective necessitates informing the system explicitly about devices installed or places to look. In some cases, these data bases are used as input to statistically link drivers into the kernel. In some cases, these data bases are used as input to statistically link drivers into the kernel. Configuration files are scattered throughout the system and multiply as new system services are brought on-line. The result is fairly uniform; a plethora of obscure, ill- formed, and usually inconsistent set of steps is required to add a new device.

A better paradigm is one which inverts the current perspective to add a new device. According to a preferred embodiment, this philosophy is called "let resources find you." In the "let resources find you" paradigm a SCSI ensemble would report drives to the mass storage subsystem which would then report mountable logical drives (volumes or partitions) to the file system. In this way the user no longer has responsibility for configuring some database to tell the file system what volumes to mount and the file system is relieved of the burden of probing all possible hard drive interfaces for drives and volumes.

A device may not always have as direct and intuitive a client as in the above example. In these cases a device would register with a central "parts bin" as a non-specific resource. For example, an RS232C port might register itself with the parts bin, later to be pulled from the bin by some user action and used to configure a modem or printer port. In this case, the user is assured that the options presented are valid because only those devices which are available and un-assigned find their way to the parts bin.

"Plug & Play" user model

The culmination of "let resources find you" is the Plug & Play user model. Plug & Play operation frees the user from having to deal with configuration files to add or remove input/output hardware.

Dynamic installation and configuration

The dynamic configuration of both hardware and software is a required feature to support Plug & Play model of a preferred embodiment. To achieve this goal, configuration of device software requires the dynamic installation of device specific software (interface ensembles). For example, a SCSI interface capable of "host-plugging" would need to reconfigure the devices and services it provides as devices are added or removed from the bus.

This capability can be extended into more dynamic scenarios where individual instances of ensemble pieces may be created and destroyed at will, including un-injection or removal of interrupt handling kernel code in an unobtrusive manner.

Flexible abstractions with decentralized policy

Use of flexible abstractions throughout the IO architecture allows many design decisions to be deferred to the framework developer instead of becoming fixed in the base architecture. This increases the options available to the designer and allows him to make the best set of trade-offs with respect to his problem domain. The set of trade-offs can span performance, security, device allocation, and device access policy issues.

As an example of the flexibility this provides, each device abstraction will define whether the device can be shared or is limited to one client at a time. Decentralization of this device allocation policy decision allows such policy to change at a later time without having any impact beyond the scope of the particular device.

In addition to defining client/device access policy, the device abstraction must allocate required resources such as IO address space and interrupt source (IRQ). These lower level resources are managed for each IO framework by an interrupt services framework. The coordination of these resources is effectively invisible to the individual IO frameworks unless a conflict occurs.

The effect of decentralized policy is to reduce the number of dependencies a device abstraction needs to deal with and increase the opportunity for the individual framework designer to set proper policies at an appropriate level. The value of decentralized policy becomes more apparent when porting the software to accommodate new hardware systems which diverge from the initial implementation's frame of reference.

Increased system reliability

Current levels of systems reliability achieved by today's common desktop operating system technology are unacceptable for a new system. Progress has been evident in this area with features like protected address spaces and user mode drivers. Even with these advances, IO architectures have not made any significant contribution to the cause of system stability. A preferred embodiment addresses this shortcoming.

Recovery from processor exceptions within interrupt handlers

Most systems are very unforgiving toward exceptions generated while the system is executing interrupt code. The resulting system crash is hardly a model of system reliability and often seems inexplicable. To improve this, the IO architecture of a preferred embodiment supports both default and custom exception handlers for the interrupt domain.

Error Logging

IO Error logging is an effective way to track problems and provide diagnostic feedback when non-fatal errors occur. A preferred embodiment supports flexible services for such logging.

Automatic reclamation of resources

A preferred embodiment achieves proper reclamation of resources. In particular, a preferred embodiment detects, and cleans up after, an abnormal termination.

Support for diverse hardware

A preferred embodiment supports a wide range of devices, processors and buses. The actively supported devices range from simplistic non-interrupt driven devices (for example, the Apple SWIM floppy controller chip) to DMA or channel based disk controllers. A full range of IO buses are supported, once again from the simple (ISA) to the sophisticated (Micro Channel or NuBus). This IO architecture is processor-independent and supports all known processor configurations, including multi-processing.

STRUCTURE OF THE OBJECT-ORIENTED INPUT/OUTPUT SYSTEM

Service Frameworks

When an end user orders a piece of equipment he is seldom simply acquiring hardware. Rather, he is instead attempting to obtain some level of service. For example, modem manufacturers provide a means of achieving some level of telecommunication service. Selling modems is just one element of the real transaction.

Accordingly, it is no longer adequate to simply make a device accessible, the focus must shift to the desired services. To this end the IO system of a preferred embodiment is service oriented. Rather than providing Disk Drivers, the system provides Mass Storage Services. The traditional concept of a disk driver is simply a means for software to access a drive. Mass storage services include additional responsibilities such as providing the file system with usable partitions and making provisions for the technical and user interface tasks of drive partitioning and formatting. It is important to recognize that a preferred embodiment expands on the traditional roles of device interfaces by raising the level of service provided.

Some of the input/output services provided by the IO system of a preferred embodiment include (a) Mass Storage IO services; (b) Keyboard processing services; (c) Mouse/Pointing device processing services; (d) SCSI services; (e) Serial communications port services; (f) Expansion bus management services; (g) Desktop bus IO services; and (h) Power management services.

According to a preferred embodiment, IO service frameworks are provided for enabling an end user (such as a human operator, an operating system function, an application program, etc.) to perform these and other input/output services. In particular, an end user can interact with these IO service frameworks to perform any supported input/output operations.

Figure 1:
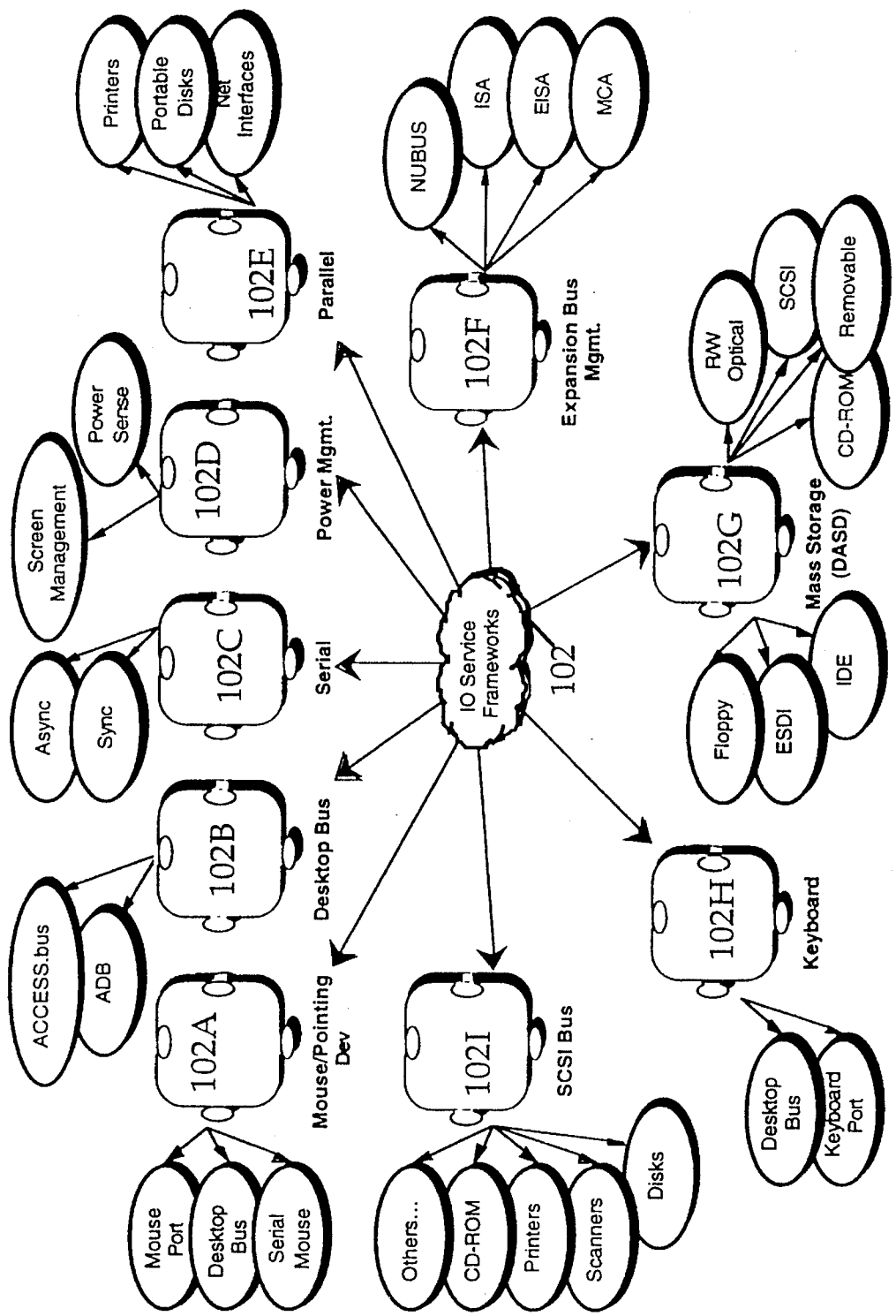
FIG. 1 illustrates input/output service frameworks according to a preferred embodiment of a preferred embodiment.

The major IO service frameworks 102, along with some of the specific services they provide and devices they access, are shown in FIG. 1. (services and devices are shown as ovals). These IO service frameworks 102 include (1) a mouse/pointing device framework 102A, which provides services relating to a mouse port, a desktop bus, and a serial mouse; (2) a desktop bus framework 102B, which provides services relating to an access bus; (3) a serial port framework 102C, which provides services relating to the synchronous and asynchronous transfer of data via serial ports; (4) a power management framework 102D, which provides S services relating to power sensing and screen management; (5) a parallel port framework 102E, which provides services relating to interaction with parallel-type devices (such as printers, portable disks, network interfaces, etc.); (6) an expansion bus management framework 102F, which provides services relating to the interaction with expansion buses; (7) a mass storage device framework, which provides services relating to mass storage devices; (8) a keyboard framework 102H, which provides services relating to keyboard input devices; and (9) a SCSI bus framework 102I, which provides services relating to a SCSI bus and devices connected to this bus.

It is entirely possible (in some cases, necessary) for some of these services to become clients of others to achieve the desired goal. For example, in some configurations, the Mass-Storage framework 102G would be a client of the SCSI framework 102I. The SCSI framework 102I could, in turn, be a client of the expansion bus framework 102F. The Pointing Devices framework 102A would have to become a client of the serial port services framework 102C to use a serial port mouse. The IO frameworks 102 are also clients of many other operating system services which are not related to device interfacing.

Underlying IO Frameworks

The IO services frameworks 102, described above, represent an end user's interface to the IO system of a preferred embodiment. The IO services frameworks 102 operate with the following lower-level frameworks to perform their respective tasks: Interrupt Services Framework 206; Interrupt Handler framework 208; and access manager framework 210. These frameworks represent the fundamental building blocks of the IO system.

Figure 2:
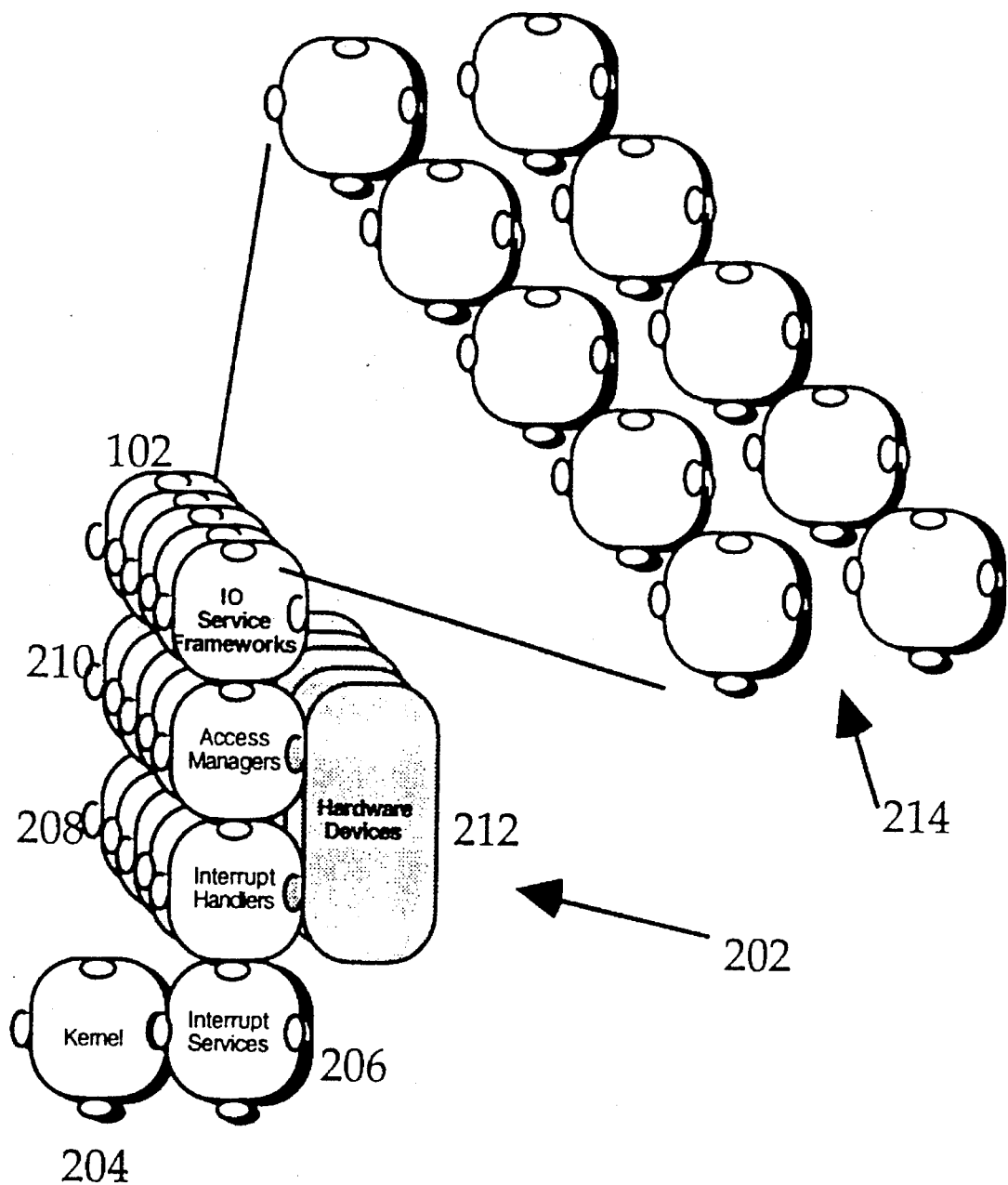
FIG. 2 illustrates an overall structural block diagram of the input/output system of a preferred embodiment.

FIG. 2 illustrates how these frameworks communicate and interact to provide multiple services (as noted above, instantiations of these frameworks are called ensembles, and are shown in FIG. 10 as elements 1032). FIG. 2 essentially represents an overall structural diagram of the IO system of a preferred embodiment.

At the IO Service Frameworks 102, each framework presents to its clients 214 an interface which is consistent from platform to platform. Thus, the interface for a particular framework, Mass Storage, for example, would be the same for a PowerPC implementation as it would before an Intel Pentium or Motorola MC68040 implementation.

The Interrupt Services Framework 206 provides kernel-based services for managing multiple Interrupt Handlers 208, performing a first level interrupt decode and dispatch to the appropriate Interrupt Handler 208. This framework is also responsible for many management tasks.

The Interrupt handlers 208 (such interrupt handlers representing instantiations of the interrupt handler framework 208) are device-specific abstractions which process device interrupts. This is an optional building block which is required only when the device being managed generates interrupts. handlers run in kernel mode and thus have access to kernel privileged instructions and operations.

The Device Access Managers 210 (which are instantiations of the access manager framework 210) are user-mode abstractions that execute outside the kernel and are charged with all tasks associated with hardware access.

The hardware devices 212 in FIG. 2 represent the hardware devices which are being managed by the IO system of a preferred embodiment. Note that the access managers 210 and the interrupt handlers 208 communicate with the hardware devices 212.

The interrupt devices 206 are in communication with the kernel 204, which is preferably the Mach micro-kernel developed by IBM, which is well-known to those skilled in the relevant art.

Operation of the Object-Oriented Input/Output System

The IO system of a preferred embodiment operates preferably as follows. A client 214 sends requests for services to a specific IO service framework 102 associated with the client. The IC) service framework 102 uses its associated access manager 210 to load an appropriate device register with an appropriate command, such as "write a byte," "buffer a block," or whatever the appropriate action might be.

Interrupts progress from bottom to top in FIG. 2. The kernel based Interrupt Services Framework 206 catches processor interrupts and calls the interrupt handler 208 it has registered for a particular interrupt level or IRQ. The Interrupt Handler 208 queries the hardware and sends appropriate messages to its associated Device Access manager 210. The Device Access Manager 210 performs a hardware interface operation such as reading a buffer and notifies the appropriate IO service framework 102 via a method call or IPC (inter-process communication), as appropriate. Finally, the IO service framework 102 takes appropriate action, such as unblocking a client thread by sending it data.

Figure 3:
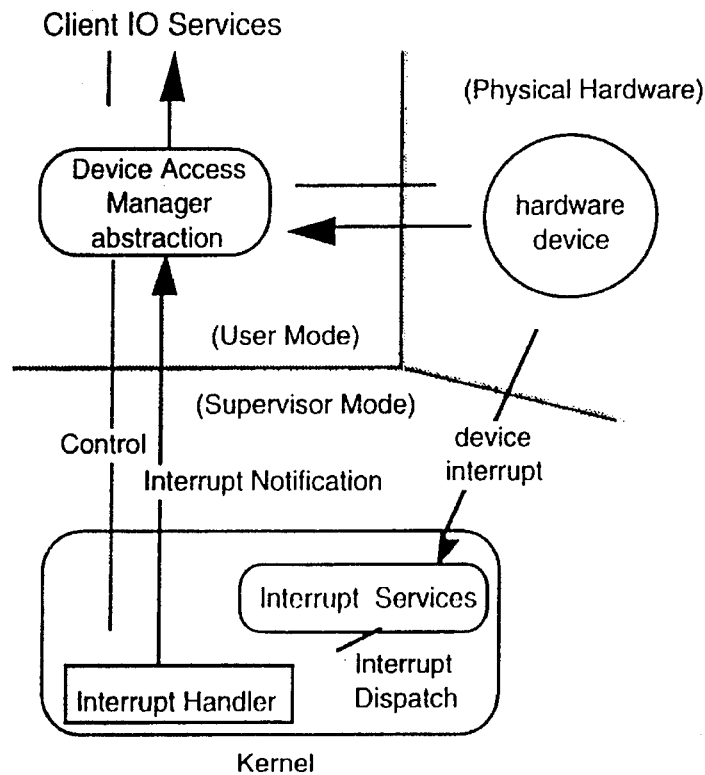
FIG. 3 illustrates abstractions involving a device access manager and an interrupt handler, and depicts the data flow between these elements of a preferred embodiment.

Any Device Access Manager 210 and its associated Interrupt Handler 208 could perform the functions found in a conventional device driver, as shown in FIG. 3. Both the Device Access Manager 210 and Interrupt Handler 208 have a direct access to their hardware device 212. This allows the developer to balance function between the Device Access Manager 210 and the Interrupt Handler 208 to meet the implementation specific, overall design goals. With reasonably advanced IO hardware, functionality (and code volume) could be predominantly vested in the Device Access Manager 208 while the size and complexity of the Interrupt Handler 208 could be minimal.

The specific location of a feature or function is left to the designer. To what extent a feature resides in either the Device Access Manager 210 or Interrupt Handler 208 should be governed by the designer's requirements and the following rule: If there is not an overwhelming dear purpose for implementing the code in the Interrupt Handler 208, it should be in the Device Access Manager 210. This rule is based on the intent to keep Interrupt Handlers 208 as small and simple as possible (in view of practical considerations)to enhance performance.

Interrupt Handlers 208 are installed and removed at the request of their respective Device Access managers 210. Normally, there is a one-to-one mapping of Device Access Managers 210 to Interrupt Handlers 208. That is to say, each Device Access manager 210 usually installs only one Interrupt Handler 208. Exceptions to this one-to-one mapping are recognized and allowed for. Some of these exceptions might be: (1) a Device Access Manager for a polled device which generates no interrupts may not have to install any Interrupt Handler; (2) Some hardware may have multiple instances of homogenous devices capable of generating many distinct interrupts. (For example, ISA serial port cards with multiple UARTs.) In this case, the designer may elect to use a common Device Access Manager which would install Multiple Interrupt Handlers.

Referring again to FIG. 3, Device Access Managers and Interrupt Handlers communicate by using two standard interfaces. First, a Device Access Manager can initiate a bi-directional communication transaction by using a Control mechanism. Second, an Interrupt Handler can send a limited amount of data to any task through an Interrupt Notification service. The intent of this interface is to allow interrupt notification which communicates limited state information to the Device Access Manager. Any standard and appropriate communication interface can be used to implement the Control mechanism and Interrupt Notification service.

The operation of a preferred embodiment shall now be discussed in greater detail. The IO service framework 102 interacts with its Device Access Manager 210. The Device Access Manager 210 makes buffers ready by asking the memory management services to make the virtual address range ready for IO. The Device Access Manager 210 then interacts with the hardware device 212 directly or with the device Interrupt Handler 208 through the Control method.

The hardware device 212 accepts or supplies the requested data. At some point the hardware device 212 generates an interrupt that is received by the Interrupt Services Framework 206 and dispatched to the correct Interrupt Handler 208.

The Interrupt Handler 208 may access the hardware device 212 and examine the state of the hardware device 212. It then notifies the Device Access Manager 210 via the Interrupt Notification service, possibly sending some necessary state information with the notification.

Next, the Device Access Manager 208 unlocks the client's resident IO buffers. Finally, the Device Access Manager 208 informs the client 214 via one of the IO service frameworks 102 that the requested action has been completed.

DeviceAccess Manager

Why have Device Access Managers 208 instead of classic drivers? The answer is in the expanded role that is required of the IO ensembles of a preferred embodiment. Each type of device has differences in access rules and protocol. Constricting this diversity into a "one-size-fits-all" interface abstraction is common practice among current OS architectures. To honor the goal of enabling innovation, it must be recognized that any given set of these access protocols may be diverse. Thus, each category of device must be allowed to define its own abstract interface. For example, printers and tap drives are unlikely to be shared among multiple clients. However, by using a different process policy, a printer port could give the illusion of being shared by managing a spooling queue. Thus, the Device Access Manager 210 can encapsulate, hide, and have control over its access policy.

Device access policy cannot be globally, clearly, or correctly predicted for all present and future devices. Attempts to do so will result in a constricted IO model which cannot adjust to new hardware innovations. A preferred embodiment does not set global IO access policy. Any global device access policy that might be imposed today would most likely be incorrect or inadequate in the future. The IO system of a preferred embodiment addresses this issue by deferring as many policy decisions as possible to the Device Access Managers 210. It is therefore a functional role of Device Access Managers 210 to define the access policy of the device.

Another reason for the user-mode access manager 210 is to provide for the placement of device service functionality outside the kernel space. This has the advantages of reducing kernel bloat and enhancing system stability.

Interrupt Handlers

The Interrupt Handler 208 is an interrupt-source-specific abstraction that processes interrupts and runs within the kernel's address space. An Interrupt Handler 208 is device specific because its code has detailed knowledge of the target device 212. However, an Interrupt Handler 208 may be generic in the sense that it is capable of handling multiple instances of a device at different physical locations. (That is to say that an Interrupt Handler cannot field interrupt notifications for both a UART and a SCSI interface chip but may be able to field interrupts for multiple UART chips.)

All Interrupt Handlers are subclassed from an abstract base class TInterrupt Handler. The TInterrupt Handler class defines the required interface between device specific Interrupt Handlers and the kernel's Interrupt Services Framework. Objects in the device specific subclass, as well as any other objects used by the Interrupt Handler, are processed into a shared library.

The installation of an Interrupt Handler 208 by a Device Access Manager 210 initiates a "death watch" so the Interrupt Handler 208 may be removed automatically if the Device Access Manager 210 is destroyed. This way the system can guarantee that resources used by the Interrupt Handler 208 will be reclaimed when the Device Access Manager 210 is removed. This death watch is managed unobtrusively by the Interrupt Services Framework 206.

Interrupt Services Framework

The interrupt services framework 206 encapsulates kernel level services used by Interrupt Handlers 208 as well as providing interrupt decoding and dispatch to the appropriate Interrupt Handler 208. The services provided by the Interrupt Services Framework 206 include:

(1) Interrupt Handler Installation. All kernel resident Interrupt Handlers are installed by this framework.

(2) Management of IO Resources. This task involves tracking assigned and requested ranges of the IO address and interrupt spaces to insure conflicts are arbitrated. The arbitration of these resources is likely to be of a first-come, first-served nature, but may vary from this model depending on the hardware architecture and the specific implementation of the Interrupt Services framework 206.

(3) Management of Interrupt Handler Exceptions. It is the task of the Interrupt Services Framework 206 to be the ultimate handler of processor exceptions which occur at interrupt time. This responsibility involves logging the exception as well as invoking an exception handler. If the offending Interrupt handler 208 has specified a custom exception handler, it will be invoked; otherwise, a system default exception handler will be used.

(4) Device Access Manager Death Watch. It is this framework which watches for the destruction of access managers 210 and removes any associated Interrupt Handler 208 which is still installed.

(5) Interrupt Handler Removal. When a request to remove an Interrupt Handler 208 is received, it is the responsibility of this framework to do the work, assuming the requester has the appropriate rights. Usually, only the Device Access Manager 210 which installed the Interrupt Handler 208 has the right to remove it.

The Interrupt Services Framework must also construct and support the interrupt hierarchy. The interrupt hierarchy is an innovation which is vital to supporting location independent device abstractions, and is discussed below.

Hardware Hierarchy and Configuration

Figure 4:
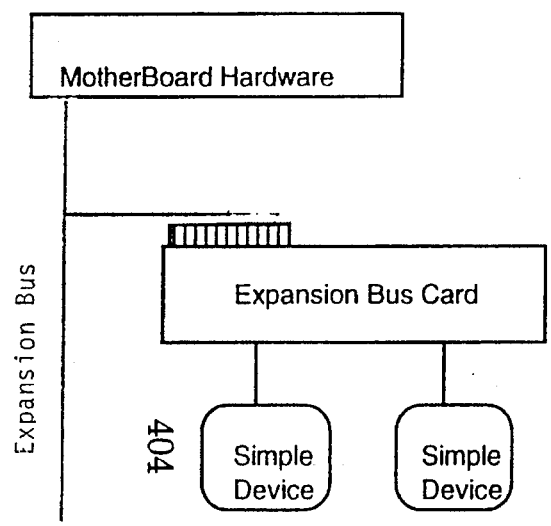
FIG. 4 illustrates an example hardware hierarchy in accordance with a preferred embodiment.

IO hardware devices can be attached to a system via many diverse hardware paths. Some are built-in on the motherboard, some are attached to buses (e.g., Micro Channel, NuBus, SCSI, IS), while other devices attach using a combination of several means. For example, a SCSI drive could be connected to a NuBus card with a SCSI chip on it. A simplifying abstraction is to view these different hardware configurations as a collection of hardware hierarchies. FIG. 4 provides an example of such a hardware hierarchy.

The hierarchy of FIG. 4 could be outlined as:

MotherBoard Hardware

Expansion Bus Card

Simple Device A

Simple Device B

By projecting this hardware hierarchy into the software domain, a preferred embodiment achieves a significant degree of flexibility and encapsulates specialized device knowledge at an appropriate level. This is described below.

Software Hierarchy

Figure 5:
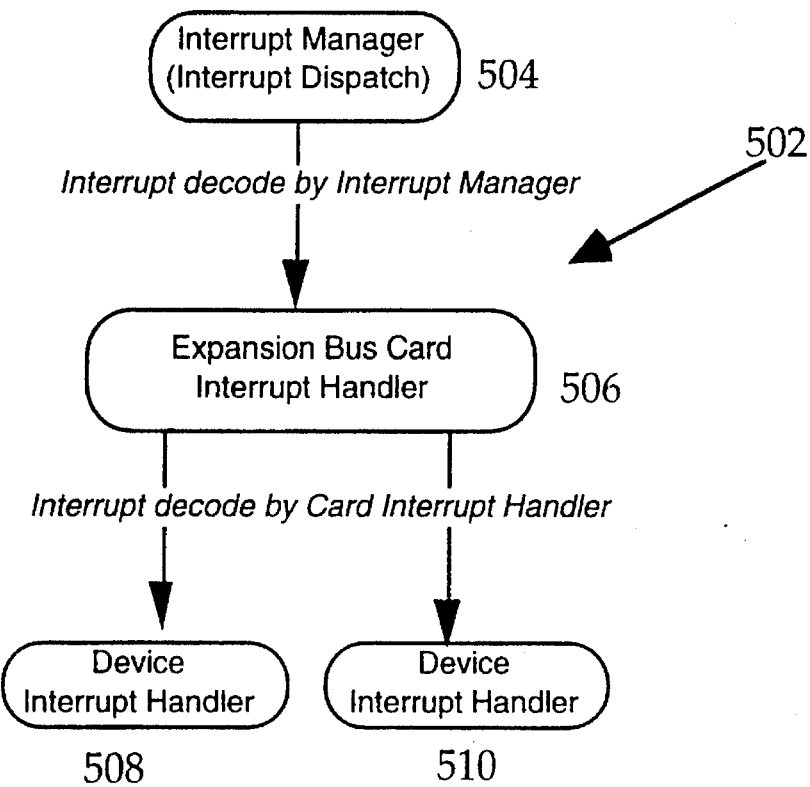
FIG. 5 is a software hierarchy corresponding to the hardware hierarchy of FIG. 4 in accordance with a preferred embodiment.

The view of hardware as a hierarchy leads to the view that-the software for these devices is also a hierarchy. A hierarchical view of software nicely restricts the scope of knowledge to appropriate layers of the hierarchy. By limiting the scope of this knowledge it is possible to push IO policy issues to the lowest levels of the hierarchy. Upon the occurrence of an interrupt, control is passed down the hierarchy until the correct Interrupt Handler 208 processes the interrupt. This is depicted in FIG. 5.

This software hierarchy is not limited to interrupt processing but spans the concerns of automatic system configuration as well. When the "root" of a hardware hierarchy is found, the root of the software hierarchy is created. The task of this software root is to find and instantiate each node of the software hierarchy as it finds new hardware nodes. A more detailed description of this aspect of a preferred embodiment is in the section on Configuration Access Managers, below.

Parent/Child Relationship

The hierarchical view of the IO architecture of a preferred embodiment uses simple parent/child relationships to manage all the nodes in the software hierarchy. Each Interrupt Handler 208 and Device Access Manager 210 has a parent relationship and may or may not have a child relationship. These parent/child relationships form the model for managing such a hierarchical abstraction. The set of all of these associations naturally and dynamically define the topology of the software hierarchy. This definition accomplishes two important goals: (a) it defines how (and in which order) the software hierarchy is constructed; and (b) it describes the flow of control when an interrupt occurs.

Defining the nodes in the hierarchy is a simple task for most IO hardware. However, in a few cases the job of distinguishing parent/child relationships is not clear. The Zilog Z8530 SCC chip is an example. This chip has two distinct serial ports (A and B) and a common interrupt register. The obvious initial design is to define two serial ports and have an Interrupt Handler for each. However, when the Interrupt Handler for port A reads the interrupt register, it obtains interrupt status for both ports and clears the register by this action. Certainly, the concept of independent Interrupt Handlers would not work for this case.

Figure 6:
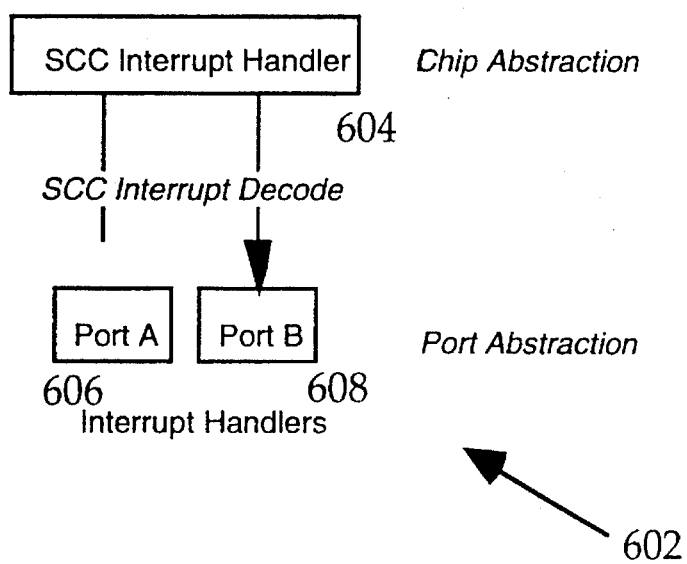
FIG. 6 illustrates a parent/child relationship in accordance with a preferred embodiment.

The solution is to define two levels of abstraction, the chip and the port. This is depicted in FIG. 6, wherein the chip abstraction is the parent and exports two software-independent serial ports. When some client application (MIDI, for example) needs to use its assigned port, it would first acquire the correct parent Interrupt Handler object (the chip Interrupt Handler) and ask to have the MIDI Interrupt Handler installed as a child to this parent.

The above has discussed how the parent/child relationship is used to construct the software hierarchy. The flow of control in the interrupt case shall now be considered.

Continuing the above example (FIG. 6), assume that SCC port B asserts an interrupt. The motherboard routes the interrupt signal to the processor and the program counter is vectored into the Interrupt Services Framework. The Interrupt Services Framework decodes the processor interrupt and dispatches the SCC Interrupt Handler.

The SCC Interrupt Handler reads the interrupt register (thereby clearing the interrupt status bits), and decodes the values that it finds and determines that port B has generated the interrupt. It calls an Interrupt Services Framework service InvokeChild to dispatch the port B Interrupt Handler, passing a copy of the interrupt register in a "parent object."

It is important to note that the SCC Interrupt Handler does not need to know what handler is the currently active child for port B. It is only significant for it to know that the child should field the interrupt.

Should the interrupt register also indicate a port A interrupt, the SCC Interrupt Handler will similarly dispatch the port A Interrupt Handler upon completion of the interrupt service for port B. In this way the individual port Interrupt Handlers will never need to perform a destructive read of the shared interrupt register.

Configuration Access Managers

Configuration Access Managers are Device Access Managers 210 with the additional responsibility for the configuration of a collection of devices, and they are the dominant element in the Plug and Play objective of a preferred embodiment. There are two kinds of Configuration Access Managers. The first has a fixed set of devices to configure and therefore has a straightforward configuration task. The second has to configure any number of "untyped" devices. This second form of Configuration Access Manager must utilize some protocol to determine both the number and the type of devices present before it can complete its configuration task.

When any Configuration Access Manager is started, it is required to find all the devices for which it is responsible. After all its devices have been found and identified, the Configuration Access Manager would then make a policy decision: either instantiate the appropriate Device Access Manager 210 or simply record that the device was found but not linked with a Device Access Manager 210.

Figure 7:
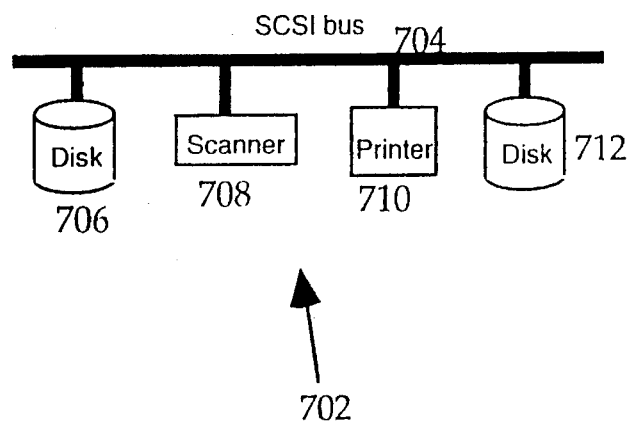
FIG. 7 is a block diagram of an example SCSI bus configuration in accordance with a preferred embodiment.

Consider FIG. 7, wherein a SCSI bus Configuration Access Manager would have to follow the standard SCSI protocol to identify what devices are currently attached to the SCSI bus 704. After a device is found, the Configuration Access Manager would then decide which device-specific Device Access Manager should be instantjared.

An example of a fixed set of devices to configure could be found on an expansion card with several devices. In this type of Configuration Access Manager, the policy decision would be hard-coded. For an expansion card containing two SCSI controllers, the SCSI chips would be known to the card's Configuration Access Manager. The devices on each of those SCSI buses would have to be configured by a SCSI bus Configuration Access Manager.

This example shows that the model of Configuration Access Manager can be applied recursively. The use of a software hierarchy to manage an arbitrary hardware hierarchy allows the IO system to dynamically configure any hardware platform or configuration.

Data Transfer and the Device Access Manager

Data can be transferred to and from a hardware device by the processor (programmed IO) or by the hardware (Direct Memory Access, DMA). Channel Processing, the use of a dedicated IO processor together with DMA, represents a combination of these transfer options.

That programmed IO is supported by a preferred embodiment should be apparent from the above examples of Device Access Managers.

A set of DMA related services are available to device interface ensembles. These services include: (a) Dynamic assignment of DMA channels to clients; (b) Support for scattered-read, gathered-write (also known as scatter-gather); (c) Encapsulation of hardware limitation (such as the 24 bit addressing limit of ISA bus hardware). The DMA services allow DMA devices on the systems by providing an intermediate buffer in the preferably lower 16 Mb of physical memory. Since this capability slows down the data transfer, it is optional; and (d) DMA services classes may be subclassed :to support third-party bus masters.

These DMA services are targeted at better hardware support than is found on ISA systems. As the hardware base advances, the DMA model may delete some features necessary for support of the ISA bus legacy. On MCA, EISA and other wide bus architectures, such features should not be necessary.

Architectural Example

As stated above, a preferred embodiment enables the reuse of object technology and the use of abstractions to move IO software forward. An example illustrating these advantages of a preferred embodiment is considered in this section.

Figure 8:
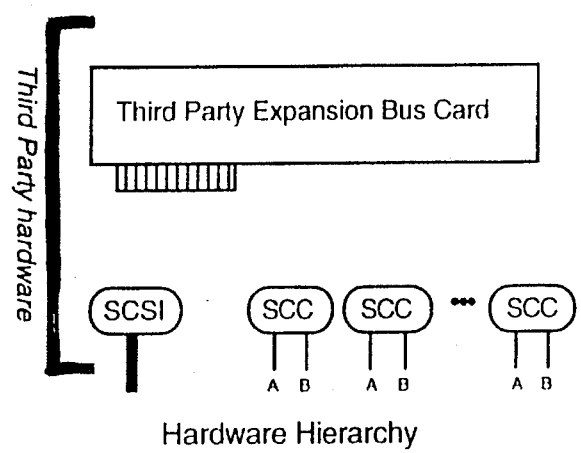
FIG. 8 illustrates another example hardware hierarchy used for illustrating the features of a preferred embodiment.

Suppose a third party developer decides to make and market a simple value-added card. Market research exposes the need for an expansion card with a SCSI bus and several serial ports (see FIG. 8). The developer chooses to use the same IO chips that the target OEM uses.

Building the hardware card is straightforward, but how much software does this third party developer have to write? According to a preferred embodiment, the developer would have to write very little software. This is the case, since most of the software to control the card is supplied by existing ensembles.

Figure 9:
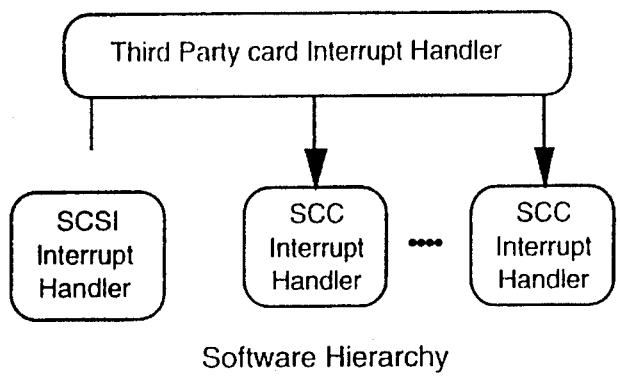
FIG. 9 illustrates a software hierarchy corresponding to the hardware hierarchy of FIG. 8 in accordance with a preferred embodiment.

Because of leverage at both the hardware and software level, this third party developer only had to develop a small part of the software solution. Referring to FIG. 9, his contribution was the Third Party card Interrupt Handler and the card-specific Configuration Access Manager (not shown in FIG. 9). The rest of the ensemble was provided by others.

Support for Multiple Processors

The IO system of a preferred embodiment preferably tracks the Multi-Processing (MP) capabilities of the underlying kernel. MP support is preferably focused on Symmetric Multi-Processing (SMP) utilizing the well known Uniform Memory Access (UMA) model.

The ability to support device ensembles for any MP configuration is dependent on appropriate kernel supported and implementation specific synchronization primitives. For Interrupt Handlers (in-kernel synchronization), a TInterrupt-Mutex synchronization mechanism is required. For device Access Managers and other user-mode abstractions, the systems standard set of user mode synchronization services (monitors, semaphores, and the like) will be sufficient.

OO BOOTING FRAMEWORK

The seminal operation of booting a system is to provide a primitive vehicle to get the system software up and running. To support this operation, the booting framework provides facilities to prepare for and control booting. The booting framework divides out into three logical parts: 1) the direct client interface definition, 2)the framework definition, and 3) the service definition (internal steps and implementation).

Some of the goals and requirements of the booting framework:

Provide a primitive vehicle to get the system software up and running.

Manage and hide some of the system interdependencies.

Minimize the restrictions of boot time executables.

Provide simplicity and expansion with third party access.

Portable solution for all Pink processor and IO platforms.

Reduce the time to market for hardware and system software.

Support booting from multiple boot data sources.

Be robust in the case of user and hardware errors.

The booting framework must provide a set of base system functions. Polite and unobtrusive implies that the booting framework should not place a heavy burden on the software it activates. The use of an open and extensible booting model guides much of the boot design. The model uses a collection of files rather than a single bound file as the bootable unit. The file resolution of boot image members is a key design direction which supports the open model. The set of objects that become active during booting exist in the context of individual files, which can be added or removed in a straightforward and intuitive manner. This enhances the update and extend capability of the system software.

The use of the object-oriented frameworks and code reuse by the low level Pink operating system servers creates the requirement to provide availability of objects during system initialization. This problem is addressed in a preferred embodiment by utilizing a memory based boot image. The memory based boot image is a set of self contained objects with all necessary interdependencies resolved. The set includes enough system software to mount a backing store device which thereby provides access to the rest of the software not included in the boot image. The system can thus be booted by bringing up the low levels of the system out of this boot image and then going outside of the boot image to bring up the rest of the system.

A preferred embodiment must also provide a mechanism for satisfying kernel paging requests during booting prior to the availability of the file system and IO system. A Boot Content Server is employed to resolve this issue. The boot content server utilizes the data source independent content server based paging architecture. The content server decouples the kernel memory manager from the file system, and enables memory manager requests to be serviced in a consistent manner, with or without a backing store based file system. It provides access to the kernel memory manager, and to the various files in the Boot Image. Prior to the time that the file system is up and running, the paging requests will be handled by this Boot Content Server. The entire set of files and data structures known to the Boot Content Server is memory based. There are no interactions between the Boot Content Server and any backing storage device. The Boot Content Server is transitory and gives way to the true File System as early as possible.

The boot framework defines several key interfaces to encapsulate and modularize the booting work. The use of a booting framework eases the effort required in porting to new OEM platforms and new boot source devices as boot sources. The modularity provides a CPU platform and boot source device independence. The foundation of booting is thus not pinned to a particular ROM or piece of start code. The booting design embodies a minimum system at boot time which contains some of the key services, and enables much of the software executing at boot time to use features in a consistent manner. For example, the booting framework supports the use of File System properties and preferences during the boot process. Boot control is driven implicitly rather than explicitly. Hand crafted configuration scripts are not used. The set of files present in the boot image, the set of hardware present on the system, and the set of properties on the boot image files work together to guide the order and selection of boot time execution. The hardware to device driver binding is handled within an abstraction enabling polymorphic configuration by the booting control software.

Booting Framework Architecture

The architecture of the booting framework includes several interdependent components wrapped around a boot image. The Boot Image is the logical set of files required to bring up the system to the point of supporting the kernel with backing store, native IO, the file system, and mounting the necessary backing store device(s). Once these services are in place, the system can execute independently and employ the file system and access managers to bring up the rest of system software services, such as the high level toolbox pieces, from backing store. The boot image model helps the booting framework solve the circular dependency problem by gathering the entire set of required pieces together in one set which is available to the system as it boots. The focal act of booting becomes very simple: do a primitive fetch of this boot image into RAM, execute code out of the RAM-based boot image, then segue into the rest of the system.

Figure 11:
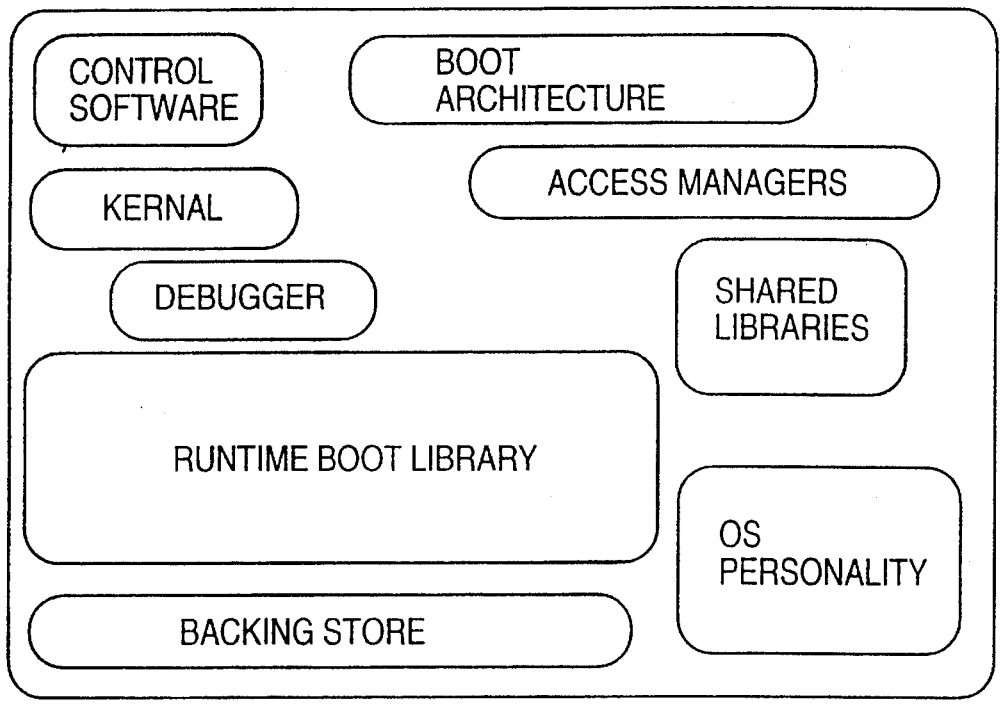
FIG. 11 is a block diagram of the components of the booting framework in accordance with a preferred embodiment.

FIG. 11 is a block diagram of the components of the booting framework in accordance with a preferred embodiment. Fundamental is relative to the boot device. That means that in the case of a local disk boot, the disk driver software, local file system, and their dependent shared libraries would be fundamental. Conversely, network and remote filing software would not be fundamental to a local disk boot. There will be some cases which do not include backing store support- but rather that run some memory based system, like a simple utility. Also, there will be cases where the kernel debugger is not necessary, and is thus not included in the boot image. The boot image depends on the following basic fundamental building blocks: objects, shared libraries, library searchers, client/server protocols, subset of the File System interface, preferences, time service, token server, and hardware configuration services. There is a direct correspondence between the files existing in the RAM resident boot image and the files existing on the boot source device. The booting service must ensure consistency among the files in the boot image on the boot device, the boot image descriptor on the boot device, and the files in the boot image in RAM.

The selection of services for inclusion in the boot image is critical. The amount of software in the boot image must be mimimized to reduce memory footprint. However, sufficient services must be present in the boot image to enable the code executing out of the boot image to get its job done as efficiently as possible. The standard system software must be present in every Boot Image. Beyond that, a Boot Image may optionally provide specialized functionality to its intended users. Files can be added to the Boot Image to provide customized booting solutions for specific scenarios. For example, a scenario of multiple systems in a classroom booting up from the local network might add files to provide security and network filing capabilities to support a file server based individual desktop environment for each student.

The Booting Framework

Figure 12:
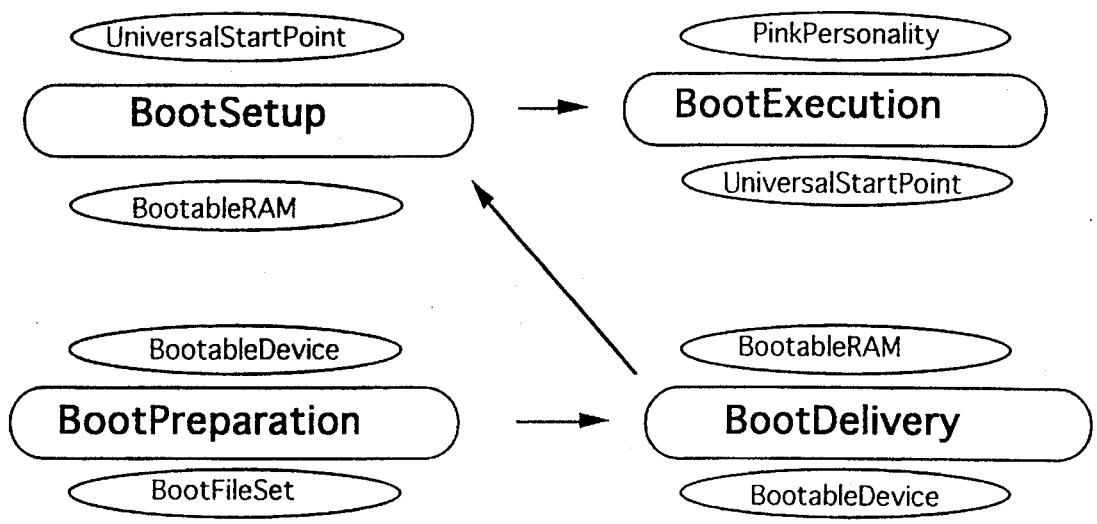
FIG. 12 is a flowchart illustrating the flow of control in a boot operation.

A framework is a set of classes that embodies an abstract design for solutions of a family of related problems, and supports reuse at a larger granularity than classes. The implementation of a particular booting system then would consist of the booting framework coupled with the boot system configuration specific components. The Booting Framework consists of four components: BootPreparation, BootDelivery, BootSetup, and BootExecution. FIG. 12 is a flowchart illustrating the flow of control in a boot operation. Each of components encapsulate a portion of the booting world. The boot image is the centerpiece to this framework and is present in various forms in each of the components.

Boot Framework Components

BootPreparation component
  BootPreparation is responsible for making a BootFileSet ready for booting on a particular boot device. This component contains pure and OEM boot device specific pieces.
BootDelivery component
  BootDelivery is responsible for system diagnostics and configuration, boot device selection, and fetching of the boot image. This component is CPU platform and boot device specific.
BootSetup component
  BootSetup is responsible for low level boot loading and environment setup. This component contains both pure and CPU platform specific pieces.
BootExecution component
  BootExecution brings up the actual system software. This component is CPU platform and boot device independent.

BOOTING TIMELINE

Figure 13:
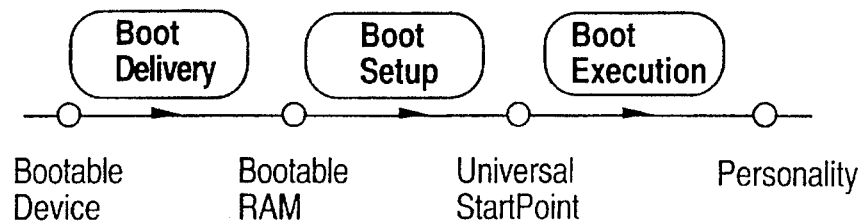
FIG. 13 shows a timeline for boot framework processing in accordance with a preferred embodiment.

FIG. 13 shows a timeline for boot framework processing in accordance with a preferred embodiment. The boot framework interfaces appear below.
BootFileSet interface
  The BootFileSet interface class presents a set of files targeted for booting. In addition to being marked for booting, these boot files contain some additional boot-specific characteristics required by the booting framework in the form of file system properties of-the individual files.
BootableDevice interface
  The BootableDevice interface represents a device fully prepared for booting. This implies the containment of a valid boot image, an appropriate boot image descriptor for this boot image, a boot anchor to provide a pathway to the boot image descriptor, and the code to use this information to obtain the boot image.
BootableRAM interface The BootableRAM interface provides foundation upon which the booting can take place. The boot image is available in memory (RAM or ROM). This includes an agreement about the state of the system being booted, and a specification of some data to be provided. The data includes hardware descriptor information and boot image memory information.

UniversalStartPoint interface

The UniversalStartPoint interface provides a common CPU platform and boot device independent entry interface to the kernel. The key notion of the UniversalStartPoint is that prior to this point there is considerable platform and device specific activity; following this point all activity will be pure activity. The interface inherits the system state agreement provided in the BootableRAM interface. Additionally, the UniversalStartPoint interface specifies some data to be provided to the kernel.

Personality interface

The Personality interface is a loosely defined abstraction of some autonomous piece of software which receives control of the machine from booting once the primary base of system software has been activated by booting. This class will bring up the appropriate based end system, and activate additional system software as necessary.

Booting Framework Details

Booting of a system is a sequential process. Therefore, it is convenient to present the boot model in the context of a sequential process, each process containing several steps. In this sense, each of the components in the booting framework constitutes a stage in this process.

Boot Preparation

The software in the BootPreparation component executes within an environment. Booting Preparation operates on files installed via the installation model. The installation model discriminates between files for general installation, and those for boot installation. The files for boot installation are referred to as boot files, and collected together as a BootFileSet. A boot file is a file installed for booting, and optionally containing some special boot properties. A BootFileSet is a set of bootfiles installed and presented to the BootPreparation component. The booting framework acts on a BootFileSet. The files in the set do not require any special custom content server, decrypter, or decompressor to access the data.

Special Boot Properties

The files in the BootFileSet may have some additional, optional information identifying some characteristics specific to booting which will be used as a filter and customizing agent within the Booting Framework. This additional booting information will be represented via TBootCommand(s) within a file system property. These properties will be queried by the boot conductor during BootExecution. These properties can be attached to the file at build time on the development system, on the desktop, or both. In fact, some of the more primitive characteristics will only be set at build time, while some of the more usercustomizable characteristics might be set in the workspace. The use of file properties described here is distinct from any use of file properties required to gather together a set of boot files.

Boot Preparation classes

BootPreparation is responsible for processing a set of boot files into a bootable collection of files. The TBootImage class is responsible for making the set of boot files bootable on the device, completing-the installation. The client of the TBootImage interface must provide the set of files; which will be passed as TCollection& theBootFiles). Once the final, valid set of files is known, the boot image descriptor and boot anchor must be created and attached to the boot device. The TBootImage is an abstract base class. The subclasses would be specific to a particular hardware platform and boot device. The TBootCommand class provides an interface giving desired execution characteristics to the individual boot files. These characteristics instantiate the boot conductor. This class can be attached to bootfiles during installation and BootPreparation; this class will be used during BootExecution.

TBootImage methods:

BootImage(TCollection& theBootFiles) protected

This parameterized constructor initializes the object state to an invalid boot image containing the boot files specified by the TCollection input.

TBootImage( ) protected

TBootImage(const TBootImage&) protected

~TBootImage( )

The destructor releases the storage holding the internal object state.

void AddFiles(TCollection& theBootFiles)

Add the specified files to the set of files contained in this boot image.

void GetFiles(TCollection& theBootFiles)

Retrieve the contained boot files.

void RemoveFiles(TCollection& theBootFiles)

Remove the specified files from the set of files contained in this boot image.

virtual ValidateFileSet( )

Check the contained set of boot files for completeness. Raise a descriptive exception if the set is not valid. Unexceptional completion tells the client that the boot image set of files is complete as far as any programmatic method can determine.

virtual Boolean ValidateDescriptor( )=0

Check whether a boot image descriptor exists and whether it is valid for this set of files. Raise a descriptive exception if the set is not valid. Unexceptional completion tells the client that the boot image set of files has a valid descriptor on the device.

virtual Boolean IsDescriptorBound( )=0

Check whether a valid boot image descriptor is bound for this boot image.

virtual TStream& operator>>=(TStream& towhere)const=0
virtual TStream& operator<<=(TStream& towhere)=0
virtual TStream& operator=(const TBootImage)=0
virtual void BuildDescriptor( )=0

Create the BootImageDescriptor appropriate for the targeted boot device. The descriptors include:

(i) File System file identifiers for each file in the boot image—to be used during the boot image reclamation step in the BootExecution component, and (ii) Boot device specific descriptor of the boot image pieces—to be used in the fetch step of the BootDelivery component. Building these descriptors may require some facilities from a file system and\or a device manager.

BuildDescriptor( ) stores this BootImageDescriptor to the boot device, with this TBootImage flattened and appended to the boot image descriptor. This is used to get back to the TBootImage from a boot image descriptor. This method makes the image available for booting here, but not necessarily the chosen one. (There may be multiple images available, and one can be considered flagged as the default chosen on to use in the absence of an explicit selection mechanism). This method will raise an exception if the boot image content has not yet been validated.

virtual void BindDescriptor( )=0

Create a BootAnchor which is a pathway for the BootImageDescriptor to be found at boot time on this boot device. This pathway is written out to the boot device and serves as an interface between the start code in a system to the BootImageDescriptor during BootDelivery. This pathway is a logical pathway—it may be simply an address on the boot device, or it may be some code to execute to find the boot image. This method makes this image the default chosen one for booting on this device. This method will raise an exception if the boot image content has not yet been validated or the descriptor has not been built.

virtual Boolean MakeBootable( )

Successively invoke the ValidateFileSet( ), BuildDescriptor( ), and

BindDescriptor( ) methods.

TBootCommand methods:

TBootCommand( )

The null constructor.

TBootCommand (TText& className, TText& libraryName)

The parameterized constructor initializes the TBootCommand with the specified class and library information.

~TBootCommand( )

The destructor releases the storage holding the internal object state.

void Run ( )

Set the BootStartEntity information into the property container. This method is used at build time or on the workspace.

There are some alternatives available as models for starting things at boot time:

(i) Create an object in the conductors address space, the object is specified via a (class, library) pair. This object can do very little, or he can proceed to go off and start more objects in new teams. This is the model offered as the default behavior in the base class.

(ii) Create a TClassTaskProgram for a (class, library) pair. Creates a TTeam [6]using the TClassTaskProgram as the constructor argument. Thus, you get the desired object up and running in a new team.

(iii) Create a TFileStreamTaskProgram for a stream to resurrect. Creates a TTeam using the TFileStreamTaskProgram as the constructor argument. Thus, you get the desired object up and running in a new team, with the object pre-initialize via the flattened object.

The TBootCommand base class will support the basic model (i) above. The booting framework may provide TBootCommand subclasses to support models (ii) and (iii).

Figure 14:
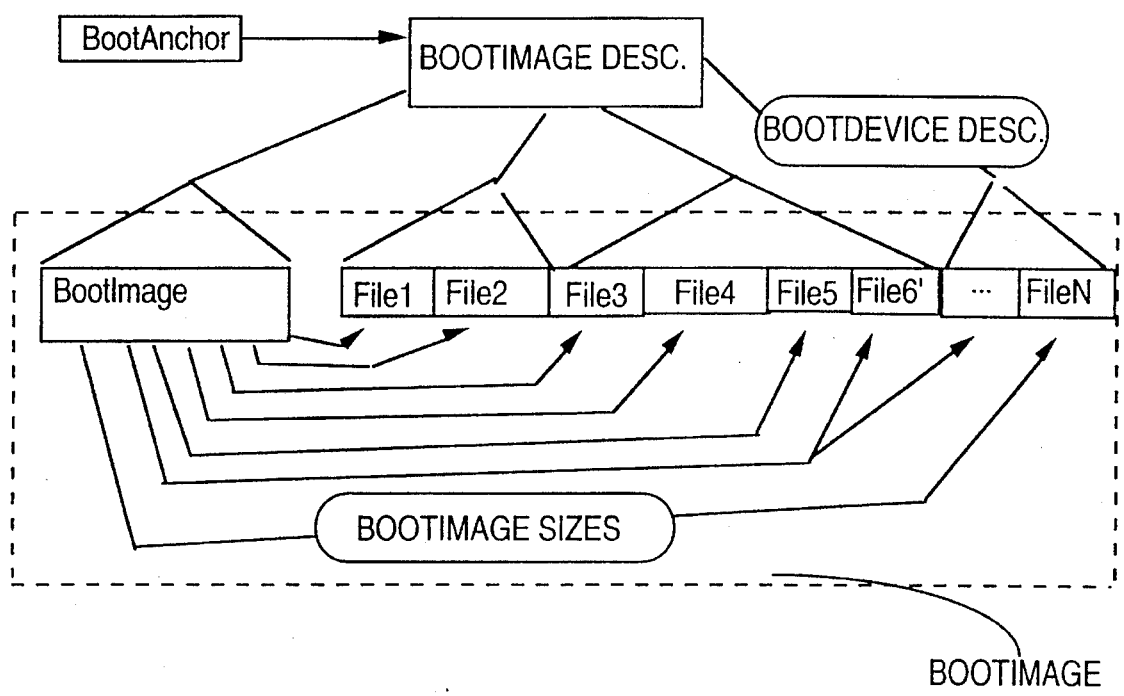
FIG. 14 is a block diagram of boot processing in accordance with a preferred embodiment.

For a particular implementation of booting on a target hardware and boot device platform there must exist a subclass of TBootImage. For example, the target for boot/ hoops is a Macintosh platform booting from an HFS based local disk. There would be a TMacDiskBootImage subclass. The workspace, after the installation of the boot files was complete, could instantiate a TMacDiskBootImage, providing a set of installed boot files. The workspace can then invoke the MakeBootable( ) method on this TBootImage to validate the set of boot files and make that set of boot files ready for booting on this hardware platform and boot device. The MakeBootable( ) would in turn invoke the ValidateFileSet( ), BuildDescriptor( ), and BindDescriptor( ) methods. FIG. 14 is a block diagram of boot processing in accordance with a preferred embodiment.

Boot Delivery

The Boot Delivery category is responsible for performing some very hardware platform and boot device specific actions. This includes low level system diagnostics, low level configuration groveling, boot device selection, and boot image fetching. The code comprising the boot delivery category resides outside of the boot image. This code can be primitive ROM code written in assembly language, or rich code written in C++. The code can even use static data, static objects, and a heap. The point is that it is up to the OEM implementation of this piece to provide the support for the language and runtime support he desires. But more generally, shared libraries become usable after the NubLibrary servers are started, which happens during the BootExecution phase. This software can reside on a ROM, on a primitive location on the boot device, somewhere else, or some combination of these locations. The order of steps within the delivery phase is not strict. In fact, some implementations may want to initially select the device, and then bring in some additional start code from the device. The booting framework does not dictate policy at this level.

The BootDelivery component provides two pieces of functionality: the boot start and the boot fetch. The boot start is the classic low level grunge code to determine the hardware configuration and to perform low level diagnostics on the machine. The hardware configuration determination is at the motherboard level. For example, the bootdelivery for a Macintosh exists in ROM. The bottom line is that however it is done, upon completion of the start code step, the configuration must be known and healthy. The start code may also offer an optional boot time device and BootProfile selection. The BootProfile is an optional identifier of the parameters to use during boot processing. These parameters provide functionality enabling or disabling for certain behaviors. The BootProfile is passed along to the boot process and used in the BootExecution component. In most cases, this step will not solicit user input but will obtain parameters from a persistent storage, such as PRAM, to guide the device and profile selection. The booting framework does not issue any policy statement regarding how a particular implementation might deal with device selection. The selection step must follow a boot anchor to locate the BootImageDescriptor. This BootImageDescriptor is then handed to the BootFetch function. The selection step is most likely specific to a particular hardware platform.

The boot fetch is the key function of the Boot Delivery category. The interface to the BootFetch is an entry point with a single parameter, a handle to the BootImageDescriptor. The BootFetch processes the BootImageDescriptor to bring the boot image from the device into memory. While fetching the boot image from the boot device, the boot map is constructed, describing the boot image placement in memory. The fetch step is specific to the particular boot device. The BootDelivery component is also asked to provide a primitive feedback mechanism. The minimum hardware configuration required must be established. Given this baseline, some universal least common denominator user feedback can be defined. For example, a beep-tone generator might be appropriate in some cases. This mechanism will be used here and during later stages of booting until a better mechanism becomes available on the other side of the UniversalStartPoint as the low levels of are coming up. This primitive mechanism should be exported as stand alone code providing this function, with a specified entry point. The memory footprint of this code will be given in the BootableRAM data.

There will be a small, fixed set of error conditions that will be recognized during the BootDelivery, BootSetup, and BootExecution stages. The booting framework will formalize these conditions via an enumerated type published in a header file. The semantics of-this primitive feedback function are designed to output a distinguishable sound or, other indicia, for each of these conditions. The specific syntax of this function will be formalized in the header file. The BootDelivery functions work together to package the hardware descriptor, the boot image memory map, and the BootProfile into the BootableRAM. Once completed, control is passed into the boot image.

Boot Setup

Figure 15:
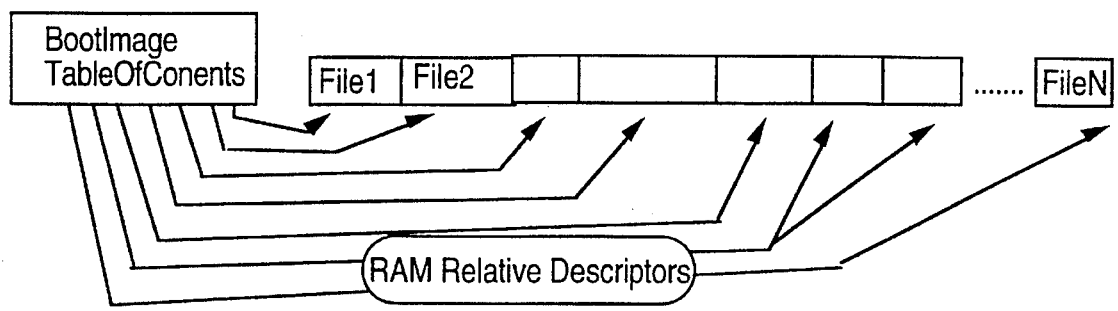
FIG. 15 is a block diagram illustrating the BootImage table of contents in accordance with a preferred embodiment.

The software in the BootSetup component executes outside of the environment. The code of the BootSetup component resides in the boot image. FIG. 15 is a block diagram illustrating the BootImage table of contents in accordance with a preferred embodiment. A BootSetup is the entry point into the boot image. The code for this component lives at a well known entry point within the boot image, taking a handle to the BootableRAM data as a parameter. The code is responsible for fixing up the boot image table of contents based on the mapping present in the BootableRAM (see FIG. 8). In addition, this code is responsible for loading (in the runtime sense of the term) the kernel. The loading of the kernel will be driven by the load file format of the kernel produced during the build of the kernel. The BootSetup is also responsible for performing any necessary processor specific relocation or fix-ups within the boot image. For new CPU platforms, the specific boot loader functionality can be replaced to deal with new loadfile formats. After the kernel is loaded, the BootSetup fills in the table of RAM descriptors and satisfies the UniversalStartPoint requirements. Once this is completed, control is passed into the kernel, invoking the kernel's main( ) entry point passing in the UniversalStartPoint set of data.

Boot Execution

The Boot Execution component is NOT intended to be overridden by the OEMs. If the OEM adheres to the framework in the Boot Delivery and Boot Setup areas, then the pure Boot Execution component can be used as is. The BootExecution component is the workhorse of the boot process. This is where we bring up the system software. The activity is split into two steps: the system genesis step and the boot conductor step. The system genesis step involves initializing the kernel and bringing up the runtime to support shared libraries. The code executing during system genesis will have a basic C runtime available; this implies at least a stack and initialized global data. The file operations during the system genesis step are handled by the BootContentServer, a kernel task which manages files contained in the boot image. The kernel itself will take care of its own initialization internally during this step. The kernel's main is called with the UniversalStartPoint data describing the system configuration information required to initialize the kernel tasks. Once the kernel is initialized, paging can begin. At this point the paging is via the boot content server managing the memory based boot image. There will also be a system genesis task linked into the kernel which starts the primordial NubLibrary servers required to support the shared libraries.

The NubLibrary is the statically linked set of runtime services, certain servers, and low level system shared libraries. This set contains the exact software required to get the Runtime system activated to support shared libraries. The set of libraries and servers bound into the NubLibrary will be determined by the Runtime group. The set of primordial servers in the NubLibrary which need to be explicitly started will be specified by the Runtime group via a private file based list. The final act of the system genesis task is to start the boot conductor program.

Boot Conductor

The boot conductor is charged with bringing up the necessary software with the required staging to support the mandatory hardware present and to give support for file access on the storage device holding the system software. The BootConductor is hardware platform and boot device independent.

Boot Conductor Classes And Abstractions

BootConductor
  The BootConductor program is the heart of the BootExecution component. It is this code that controls most of the interesting aspects of booting. What gets started when in the boot process is decided here. The set of hardware components present, the set of software present in the boot image, the properties of these components, and custom library searchers combine to drive the boot conductor actions. This program is run once, started by the system genesis task as soon as shared libraries become available.
BootFSServer
  The BootFSServer provides a subset of the File System interface. Support is provided for accessing files, open and close, file properties, and access to the data in these files. This access will be via the boot content server. The set of files known to the BootFSServer is limited to those files present in the boot image.
TBootCommand
  See description above, during this portion of the boot, the TBootCommand(s) is used to guide the actions of the BootConductor.
TBootLibrarySearcher
  The TBootLibrarySearcher class provides custom library searchers to locate shared libraries at boot time. This class will subclass from TLibrarySearcher, with CreateContainerAndFindLibrary as the key method to override. There may be multiple searchers active at boot time. The optional BootProfile might help dictate the set of TBootLibrarySearcher(s) to use during the boot. In addition, there might be special TBootLibrarySearcher to find some driver shared libraries stored on the devices rather than in the boot image, for example ROM based drivers for Nubus devices. These are mainly provided by the Taligent booting code, but could additionally be provided by OEMs.

Boot Conductor Philosophy

TMachine, the properties of the files in the boot image, and the boot library searchers provide key processes for choosing what to run at boot time. The BootProfile can be utilized to give-the boot conductor some guidance for boot library searchers to use and about which family of boot file properties to accommodate during a particular boot session. The conductor will make use of custom library searchers to find and hide access to the various objects, which is an indirect way of controlling what gets started when. In general, actions happen more implicitly than explicitly.

Primary And Secondary Objects

Primary objects are those boot image based objects which the BootConductor instantiates. These objects are fundamental to the BootConductor's focal job of getting the system up to mount the OPD. An example of a primary object is TMachine. Secondary objects are those boot image based objects which are not primary objects, but do want to run at boot time. These secondary objects can be mandatory or optional. An example of an optional secondary object would be some background printer status server. The boot conductor gives secondary objects several opportunities to execute.

Objects And Teams

The startup of primary and secondary objects by the boot conductor follows the object model of execution. The boot conductor will be instantiating objects. These objects in turn are responsible for creating active servers, launching teams, and instantiating other objects as appropriate for their purpose. Passive servers will be implicitly started using the client/server protocol. The boot executable will be specified by the TBootCommand.

Boot Conductor Sequence

The BootConductor program will consist of an ordered sequence of operations, each encapsulated in a routine of the program. This section lists the sequence of operations.
Bring up the BootFSServer
The BootFSServer will be started first. As the BootFSServer comes up, it will register with the file system resource manager, causing that server to start.
Configure TMachine and the Device Drivers
A Taligent device driver may be thought of as the assortment of objects needed to handle and integrate an I/O device into the system software. The binding of the I/O devices to these software objects is handled in the TMachine and Configuration Access Manager abstractions. The boot conductor will start the device drivers through the TMachine abstraction. TMachine is responsible for the device dependent knowledge required to map the various root hardware components to the software necessary to control them. The TMachine will provide methods for the boot conductor to start and initiate this device dependent software. The responsibility for registering with the hardware configuration server will be handled by the TMachine.

Replace the Simple Feedback Mechanism

The boot process through this point has been employing a primitive feedback mechanism provided by the BootDelivery component via the BootableRAM. Now that the device drivers and runtime are available, the Boot conductor will use a more advanced, yet still by no means rich, user feedback mechanism, the TSimpleOutputDevice. The goal is to allow for graceful degradation from across the range of facilities that might be available on different platforms at this point in the boot process (for example the range might be from a full graphics system to a printf( ) style line mode). The interface will need to be achievable in both a graphics as well as a character based world.
Bring up the File System
At this point, it is possible to bring up the FS Server. This may be local or remote. The model for bringing up the FS Server will be that of instantiating a file system object. This file system object will then be responsible for bringing up the necessary teams, servers, or whatever is required by the FS Server. This FSServer will then register with the file system resource manager, which was implicitly started earlier by the BootFSServer. Once the FS Server is up and the backing store devices are mounted, the notion of the kernel's default root content server will be transferred from the boot content server to the FS content server. New file access calls will now be serviced by the FS Server, while files opened with the BootFSServer will continue to be serviced by the BootFSServer until boot image reclamation is complete, see below.
Perform boot image reclamation
Once the file system is available, the boot conductor can reclaim some of the boot image RAM footprint. This is accomplished by iterating the set of files opened with the BootFSServer, and for each one, performing a special set of operations. This set of operations involves opening the file with the File System getting back some file system handle; then instructing the memory manager to exchange this handle with the old handle on the boot image, and finally prompting the memory manager to free up the memory extent. This gives the memory manager the ability to go to backing store rather than the RAM boot image for these files.
Configure TMachine and the Device Drivers—again
Knowing that the full file system is now available, the BootConductor can poke TMachine again to Initiate the hierarchy. During this walk through the hierarchy we expect more of the required objects to be available resulting in more of the device drivers becoming active.
Fade to
The fade to step involves starting the personality object. This object is found by the boot conductor via the TBootCommand mechanism as described for the earlier boot executables. This may be a true object, or it may just be a lightweight proxy which knows how to find and start the real object. This should be a single entity which in turn might have its own version of a startup program(s) protocol, rather than having a set of startup applications that the conductor knows how to launch. At this point the intended system is up and running, perhaps being an end in itself, or a stepping stone into something larger. Booting is now complete.

The steps of the boot conductor

Figure 16:
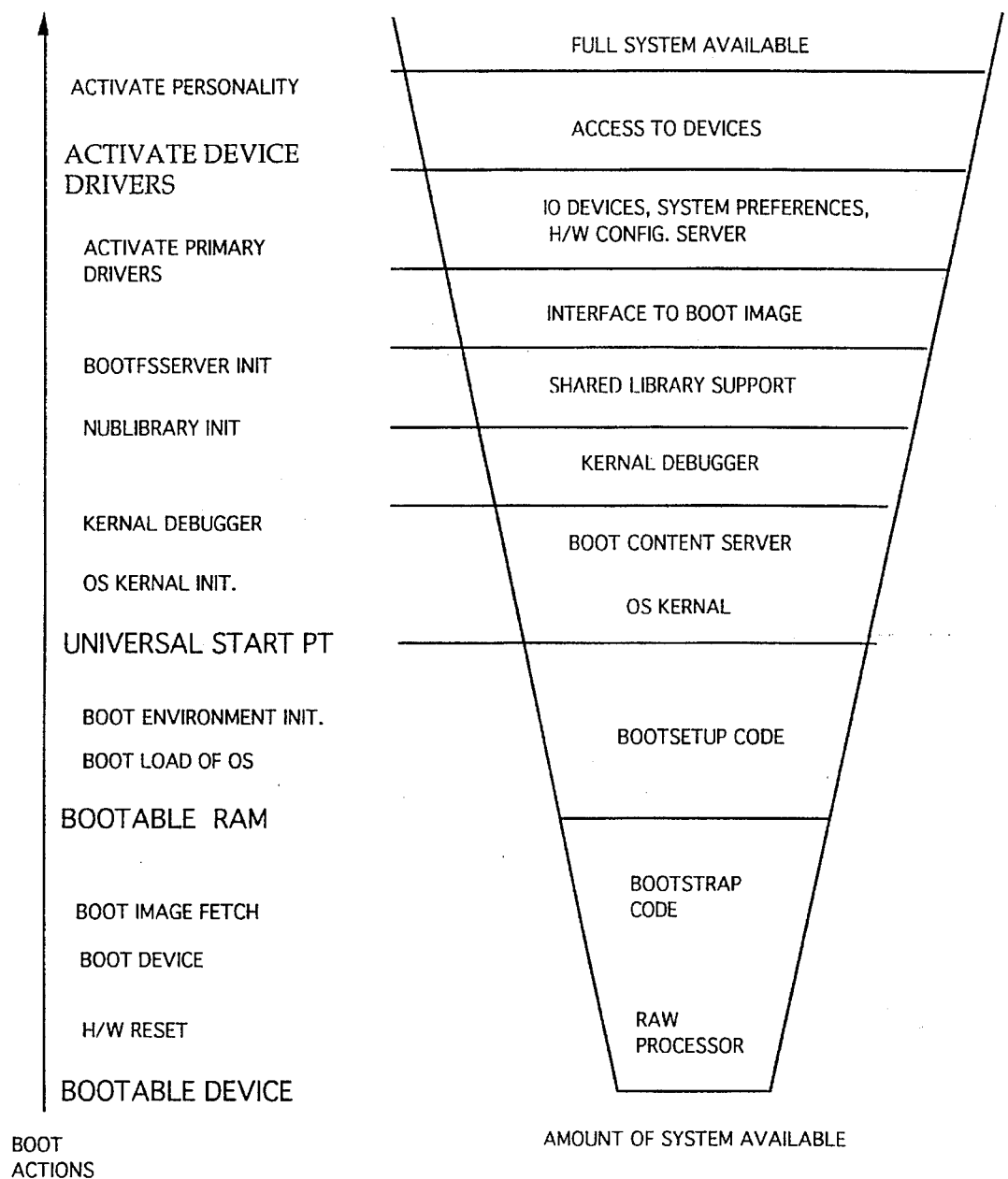
FIG. 16 recaps, via a booting timeline, the processing utilized in a preferred embodiment for booting.

There exist a set of booting progress marker points. This set will drive the boot feedback information. A subset of these points will drive the insertion points for BootStartEntities. The boot process is recapped via a booting timeline illustrated in FIG. 16. This timeline assumes the presence of a bootable device as a starting point.

Warm booting

Warm booting refers to the use of a checkpointed system state to greatly reduce the overhead required to restart the system. This is an interesting and promising concept, and involves the system at a fundamental level, not just at booting level. The booting design does not address this topic.

Soft booting (or extensible restart)

The default case for the boot/hoops implementation is a hard boot. This means that the system boot process is initiated via a hardware reset. The notion of initiating the boot process via a software reset is supported by the booting design. A soft boot would remove some of the dependencies on the ROMs and start code of the hardware platforms. A soft boot would require some additional system services to be achievable. There are some human interface issues involved in choosing the source and invoking the soft boot. There are system shutdown issues involving the guaranteed state of the system at completion of the shutdown, and where the control is passed upon completion of shutdown.

While various embodiments of a preferred embodiment have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Having thus described our invention, what we claim as new, and desire to secure by Letters Patent is:

1. An apparatus for booting an object-oriented operating system comprising a kernel program and a plurality of shared libraries containing hardware-independent, object-oriented programs onto a computer system comprising a plurality of hardware devices connected in a configuration, the apparatus comprising:
   (a) a processor;
   (b) a volatile storage attached to and under the control of the processor;
   (c) a non-volatile storage attached to and under the control of the processor, the non-volatile storage having the kernel program, the plurality of shared libraries and a hardware-specific boot image program stored therein;
   (d) boot image delivery means for loading the boot image program from the non-volatile storage into the volatile storage;
   (e) framework setup means for causing the processor to execute the boot image program to load the kernel program from the non-volatile storage into the volatile storage, to determine the configuration of the plurality of hardware devices and to generate configuration data in a universal format; and
   (f) framework execution means for causing the processor to initialize the kernel with the configuration data, to start a program which provides paging between the volatile storage and the non-volatile storage and to instantiate an object oriented file system from the shared libraries.

2. Apparatus as recited in claim 1, wherein the boot image program comprises a plurality of boot files and wherein the apparatus includes:
   (a) boot start means for determining which boot files stored in the non-volatile storage comprise the boot image program and
   (b) means for determining the configuration of the plurality of hardware devices.

3. The apparatus of claim 2 wherein each of the plurality of boot files comprises a file handle and wherein the framework execution means further includes means for using file handles of the plurality of boot files comprising the boot image program in the kernel program so that the kernel program fits into a smaller part of the volatile storage.

4. Apparatus as recited in claim 1, including operating system support for System 7, OS/2, DOS, and UNIX.

5. The apparatus of claim 1 wherein the framework setup means includes means for generating a stack and wherein the framework execution means includes means for providing a file system interface to the non-volatile storage.

6. A method for booting an object-oriented operating system comprising a kernel program and a plurality of shared libraries containing hardware-independent, object-oriented programs onto a computer system with a processor, a volatile storage attached to and under control of the processor, a non-volatile storage attached to and under control of the processor and a plurality of hardware devices connected in a configuration, the non-volatile storage having the kernel program, the plurality of shared libraries and a hardware-specific boot image program stored therein and the method comprising the steps of:
   (a) loading the boot image program from the non-volatile storage into the volatile storage;
   (b) executing the boot image program to load the kernel program from the non-volatile storage into the volatile storage, to determine the configuration of the plurality of hardware devices and to generate configuration data in a universal format; and
   (c) initializing the kernel with the configuration data, to start a program which provides paging between the volatile storage and the non-volatile storage and to instantiate an object oriented file system from the shared libraries.

7. A method as recited in claim 6, wherein the boot image program comprises a plurality of boot files and wherein the method includes the steps of:
   (d) determining which boot files stored on the non-volatile storage comprise the boot image program; and
   (e) determining the configuration of the plurality of hardware devices.

8. The method of claim 7 wherein each of the plurality of boot files comprises a files handle and wherein step (d) includes the step of using file handles of boot files comprising the boot image program in the kernel program so that the kernel program fits into a smaller part of the volatile storage.

9. The method as recited in claim 6 including the step of supporting System 7, OS/2, DOS, and UNIX.

10. The method of claim 6 wherein step (b) includes the step of providing a stack and wherein step (c) includes the step of providing a file system interface to the non-volatile storage.

11. A booting framework stored on a computer-readable medium for booting an object-oriented operating system comprising a kernel program and a plurality of shared libraries containing hardware-independent, object-oriented programs onto a computer system comprising a volatile storage, a non-volatile storage and a plurality of hardware devices connected in a configuration, the framework comprising:
   (a) subclassable boot image class information comprising information defining a data structure for holding references to a plurality of boot program files and program code defining member functions for adding boot program files to, and deleting boot program files from, the data structure and a member function for checking that the plurality of boot program files includes at least a hardware-dependent boot image delivery program for loading the boot files from the non-volatile storage into the volatile storage and a hardware-dependent boot setup program for loading the kernel program from the non-volatile storage into the volatile storage, for determining the configuration of the plurality of hardware devices and for generating configuration data in a universal format; and (b) non-subclassable boot execution class information including program code for initializing the kernel with the configuration data, for instituting paging between the volatile storage and the non-volatile storage and for instantiating a file system object from the shared libraries.

12. A booting framework as recited in claim 11 wherein the boot execution class information includes system genesis program code for generating a boot content server for managing files contained in the boot image program.

13. A booting framework as recited in claim 12 wherein the system genesis program code includes nublibrary program code having runtime routines, runtime servers and shared system libraries for supporting the shared libraries in the non-volatile storage.

14. A booting framework as recited in claim 13 wherein the boot execution class information further includes program code for a boot conductor program started by the system genesis program code and containing program code that is responsive to the program code present in the boot image program, the hardware configuration and the contents of the shared libraries for instantiating a file object to allow access to the shared libraries in the non-volatile storage.

15. A booting framework as recited in claim 14 wherein the boot conductor program contains program code to creating a library searcher for searching files in the non-volatile storage to locate shared libraries.

* * * * *